United States Patent [19]

Kushman et al.

[11] 4,109,819
[45] Aug. 29, 1978

[54] EXPLOSION VENT AND METHOD OF VENTING

[75] Inventors: Robert L. Kushman, Mason; Sumy H. C. Ling, Cincinnati, both of Ohio

[73] Assignee: The Stacey Manufacturing Co., Cincinnati, Ohio

[21] Appl. No.: 797,352

[22] Filed: May 16, 1977

[51] Int. Cl.² ............................................. B65D 51/16
[52] U.S. Cl. ..................................... 220/208; 137/527; 137/535; 220/209; 220/326; 220/331; 220/366
[58] Field of Search ............... 137/527, 537, 535, 587, 137/527.6; 292/DIG. 65, 219, 64, 71, 78; 220/88 R, 367, 203, 366, 334, 326, 331, 329, 333, 208, 209; 16/182

[56] References Cited

U.S. PATENT DOCUMENTS

| 146,619 | 1/1874 | Titus | 220/334 |
|---|---|---|---|
| 1,219,493 | 3/1917 | Scott | 220/89 A |
| 1,233,028 | 7/1917 | Clifton et al. | 137/587 |
| 1,469,567 | 10/1923 | Whiting | 220/324 |
| 1,637,298 | 7/1927 | Garcia | 220/88 R |
| 2,045,518 | 6/1936 | Chatfield | 137/527 |
| 2,169,410 | 8/1939 | Drane | 220/203 |
| 2,209,551 | 7/1940 | Anderson | 292/49 |
| 2,288,312 | 6/1942 | Brown | 220/203 |
| 2,452,612 | 11/1948 | Swenberg | 137/535 |
| 2,529,329 | 11/1950 | De Frees | 220/203 |
| 2,548,744 | 4/1951 | Simms | 4/177 R |
| 2,647,534 | 8/1953 | Freeman | 137/527.6 |
| 2,681,165 | 6/1954 | Kornhauser et al. | 220/331 |
| 2,868,412 | 1/1959 | Coffman | 220/89 A |
| 2,875,920 | 3/1959 | Coffman | 220/89 A |
| 3,355,207 | 11/1967 | Newman | 292/78 |
| 3,439,831 | 4/1969 | Pullen | 220/366 |
| 3,659,886 | 5/1972 | Andrews | 292/78 |
| 3,788,514 | 1/1974 | Giacoma, Jr. | 220/89 A |

FOREIGN PATENT DOCUMENTS

| 947,141 | 7/1956 | Fed. Rep. of Germany | 292/78 |
|---|---|---|---|
| 302,417 | 7/1968 | Sweden | 292/71 |

*Primary Examiner*—William Price
*Assistant Examiner*—Allan N. Shoap
*Attorney, Agent, or Firm*—Wood, Herron & Evans

[57] ABSTRACT

A quick-release vent structure and method for releasing a rapid pressure buildup within a vessel such as a storage bin. Vent covers are releasably seated over large vent openings presented by framework which is mounted to the vessel. Each cover is resiliently biased in place. Gas pressure in the vessel can lift the cover from the vent opening for pressure relief. If pressure raises the cover a distance greater than a predetermined amount, the biasing force is released from the cover by a quick-release mechanism and the pressure can blow the cover off without damage.

The covers are preferably held in place by spring-loaded, snap action clamps. Each clamp includes a latch member that is pressed against the vent cover by an over-center spring. When the pressure force exceeds the spring force, the latch member is cammed to swing over-center and slides off the cover edge, thereby releasing the cover so that the gas pressure can blow it off and vent extremely rapidly. The covers are easily reseatable, without replacement.

12 Claims, 8 Drawing Figures

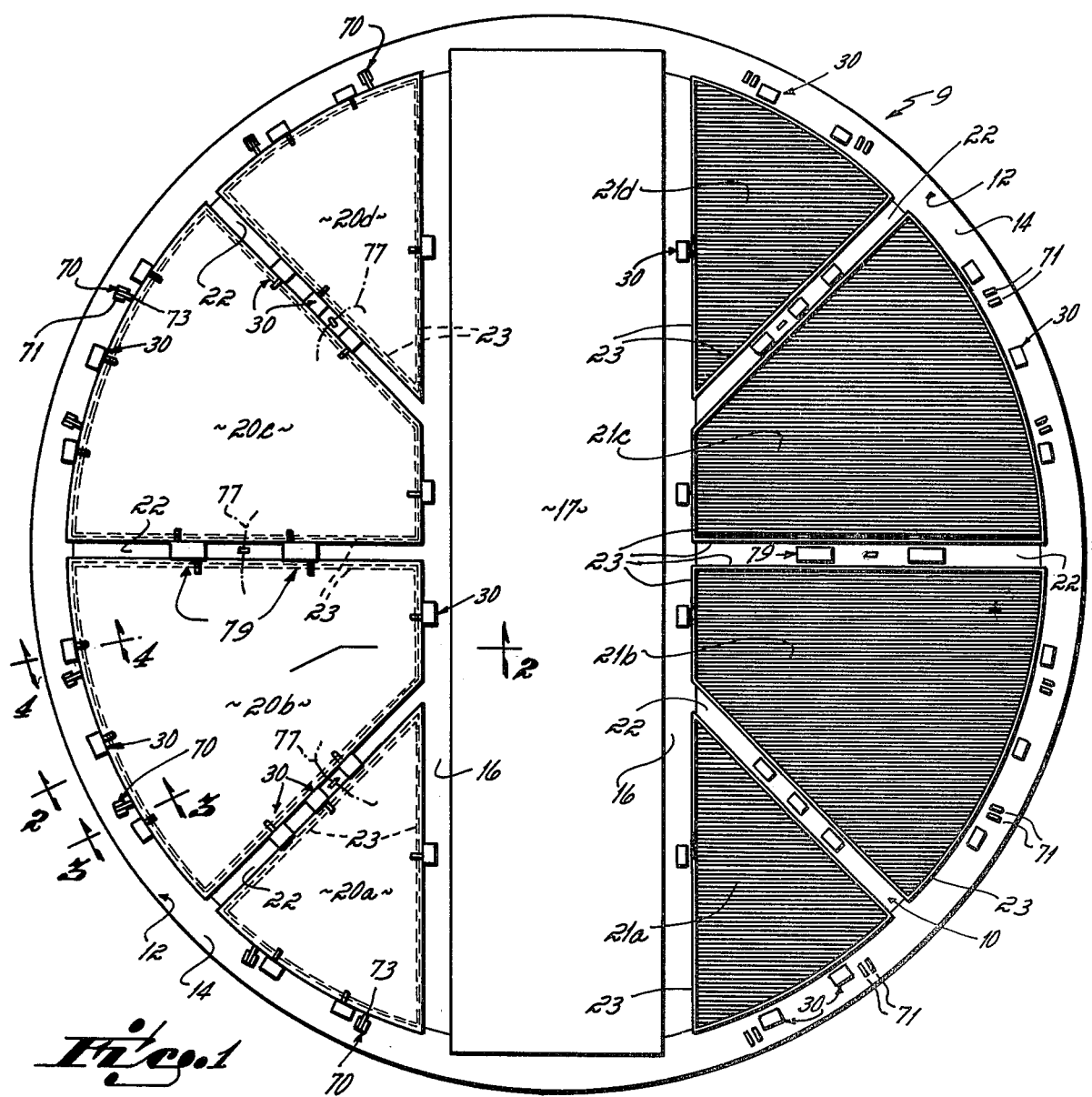

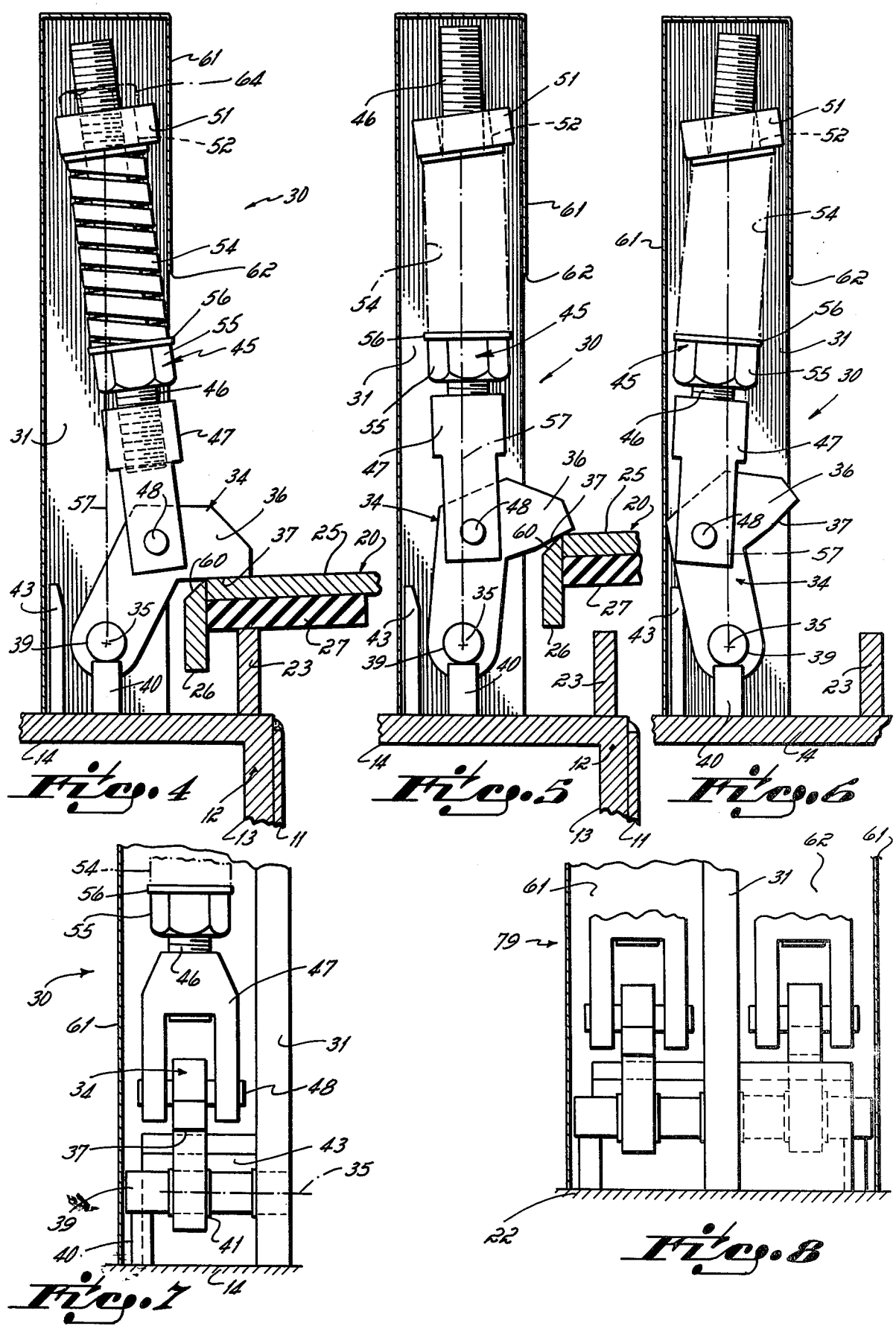

EXPLOSION VENT AND METHOD OF VENTING

This invention relates to vessels such as bins or silos for storing materials of the type which presents a danger of low level explosion or gas pressure buildup in storage. More particularly, the invention relates to explosion venting whereby such gas pressure may be rapidly vented through a vent opening, without damage to the vent cover or the vessel.

Various materials are subject to some tendency in storage to generate large amounts of gas pressure. Examples of such materials are asphalt, cork, phenol-formaldehyde resins, flour, polypropylene, and coal. While pressure relief valves will safely accommodate a relatively low rate of gas pressure venting, they are insufficient to handle the large pressure rises which such materials sometimes suddenly generate. To handle such conditions it is necessary to provide a vent area which is large in relation to the cross-sectional area of the silo or vessel. This is commonly referred to as "full diameter" or "wide area" venting to connote that the venting takes place over a substantial proportion of the area of the vessel, although not necessarily the full diameter.

THE PRIOR ART

In the past, wide area venting has been accommodated by use of frangible or rupturable diaphragms which will rip or break under sufficient internal pressure, and thereby open a vent for pressure release. Diaphragms of different rupture strengths can be used to set the release pressure at higher or lower levels. Another approach has been to provide a breakable connection between a sealing element and the vent opening. Examples of such frangible or bendable seals and connections are shown in U.S. Pat. Nos. 1,219,493; 2,548,744; 2,868,412; and 2,875,921. It is also known to tack weld explosion roof panels in place by welds which are sufficiently weak to rupture at an abnormally high internal pressure. In that approach it is difficult to assure that a given series of welds will all rupture at the desired pressure; at best it offers only a rough approximation of a desired yield point and, once formed, the welds cannot readily be adjusted or changed to provide a higher or lower yield point. In the event of rupture, field re-welding of the roof panels is required.

U.S. Pat. No. 2,529,329 shows a vent hatch with a disk which holds a gasket against internal pressure. When pressure rises sufficiently, the disk lifts and allows the gasket to rise away from the flange to open an annular vent around the gasket. However, the disk cannot be blown away to open the port for wide area venting.

U.S. Pat. No. 2,169,410 shows a pressure relief hatch on an oil tank which is held down by a spring. The spring applies force until it is compressed "solid", from which point it will yield no further unless it breaks. It does not release the hatch or permit it to be blown off.

U.S. Pat. No. 3,788,514 points out that when a vent cover hold-down spring is fully stressed, once pressure is released the energy stored in the spring can slam the cover down so hard as to cause damage. To overcome that tendency, it teaches a spring which distends inelastically as the vent cover lifts, so that the spring thereafter exerts no substantial closing force. The spring must be replaced after such venting occurs.

In another approach to the problem, releasable vent covers have been held down by spring-loaded fingers which press on the vent cover at a 45° angle to its surface, right at the vent cover edge. As pressure lifts the cover, the fingers slip down the side of the cover, thus releasing it. That arrangement is difficult to set up initially in that it requires careful alignment of the spring loaded fingers to bear diagonally precisely on the edge of the cover. Moreover, it does not permit the cover to lift significantly to release pressure buildup, without releasing altogether.

Whiting U.S. Pat. No. 1,469,567 shows an over-center lever clamp to secure a lid to a container, but the clamp holds the lid closed non-yieldably; the clamp would not open under internal pressure without actually breaking the clamp. No resilient spring force acts to hold the lid closed.

U.S. Pat. No. 2,209,551 shows a spring-biased lever as a latch for a car door, but it is constructed so that it cannot release under internal pressure.

It has been the primary objective of this invention to provide an explosion venting structure with vent covers which will yield elastically to release pressure up to a certain limit without blow off of the vent covers, but which above that limit will release very rapidly, without breakage, to provide venting over a wide area and which, once released, can readily be reset in the field without welding or part replacement. The invention will find use, among other purposes, in silos for the storage of materials such as those listed above, and in other circumstances where venting of rapid pressure rises is desirable. For purposes of illustration it is described hereinafter primarily in relation to storage silo roof structure.

The construction of the basic silo structure itself is not a part of the invention and may be conventional; the explosion roof may release the internal pressure upwardly or laterally, and may be fitted to conventional silo structure.

The explosion vent includes a framework which is mountable to a vessel, for example a roof framework for a silo or storage bin. The framework defines one or more vent openings. Vent covers are releasably seatable on the respective vent openings to close them. Each vent cover has associated with it one or more over-center clamp mechanisms for yieldably holding the cover in place over the respective vent opening to seal it. Each clamp mechanism includes a movable latch member which may be mounted to the framework. Elastic spring means such as a coil spring bears on the latch member. The latch member is movable, preferably pivotally, between a closed position in which the spring urges it to hold the cover on the vent opening, and an open position in which the spring does not so urge it and in which the latch member is clear of the cover so that the cover is free to be blown off. Pressure within the vessel tends to move the cover off the vent opening and to move the latch member, as by camming or pivoting, toward open position. Over-center means snaps the latch member into open position when the cover has been moved a predetermined distance off the vent opening, as by sliding the latch off the edge of the cover, thereby freeing the cover of restraint by the latch.

DESCRIPTION OF THE DRAWINGS

The invention can best be further described by referring to the accompanying drawings, in which:

FIG. 1 is a top plan view of an explosion vent in accordance with a preferred embodiment of the invention, in the form of an explosion roof mounted to a cylindrical silo;

FIG. 2 is an enlarged fragmentary vertical section, partly broken away, taken on line 2—2 of FIG. 1;

FIG. 3 is a fragmentary vertical section, greatly enlarged, taken on line 3—3 of FIG. 1;

FIG. 4 is a fragmentary vertical section, greatly enlarged, taken on line 4—4 of FIG. 1, showing the over-center clamp in the closed position and bearing down on the edge of the vent cover;

FIG. 5 is a section similar to FIG. 4, but shows the clamp approaching center as the cover is lifted to release pressure in the silo, but before the clamp has released;

FIG. 6 is a section similar to FIG. 5, but shows the latch member in the open position;

FIG. 7 is a fragmentary front elevation of the latching end of the clamp, and

FIG. 8 is a fragmentary front elevation of the latching ends of two similar over-center clamps mounted in side-by-side relation on the roof frame, for engaging two separate vent covers.

For purposes of illustration and not limitation, the drawings show an explosion roof for a cylindrical storage bin wherein the roof includes several separate vent covers or roof panels, each of which is releasable, arrayed on each side of a central catwalk. The provision of several smaller releasable roof panels is preferred, in place of a single large panel, because smaller panels offer less inertial resistance and hence can respond more rapidly to a sudden pressure rise. However, it should be understood that the number and shape of the individual roof panels or vent covers themselves is of no particular criticality to the invention. The arrangement shown is referred to as a "full diameter" or "wide area" venting roof, even though that portion of its area covered by the central catwalk is not releasable for venting.

The explosion is designated generally by 9 and includes a framework structure 10 which in use is mounted at the top of the side wall 11 of a storage bin or silo (see FIGS. 1 and 2). The details of the silo construction, apart from the roof, are not part of the invention and may be conventional. The framework 10 preferably includes a peripheral annular flange 12 with a vertical wall 13 which is secured as by riveting to bin side wall 11, and an outwardly projecting horizontal portion 14.

As shown in FIG. 1, the roof framework includes a pair of cross supports 16, 16 which may be I-beams, that extend from one side of the bin to the other, across the middle of the roof, or that tie into other framework. Those beams 16, 16 support a catwalk 17 which provides access to the roof panels for installation and maintenance. The illustrated embodiment has a total of eight vent covers or roof panels, each designated at 20, located on both sides of catwalk 17. The panels 20 close vent openings 21 defined by the roof framework. (In FIG. 1 the roof is shown with four panels 20 a, b, c and d in place on the roof framework on the left-hand side of catwalk 17, and with the roof panels on the right-hand side removed, showing vent openings 21 a, b, c and d.) The respective openings 21 are defined by and between the peripheral flange 12, the cross supports 16 and a series of shorter, radially directed braces 22, which are connected between the respective beam 16 and flange 12. As can be seen, the vent openings 21 are generally of pie-shaped configuration, but this shape is not critical. The over-center clamps to be described are desirably mounted to the horizontal flange portion 14 and to the central supports 16.

An upstanding rim 23 is secured to roof framework 10 around the periphery of each vent opening 21. Each roof panel 20 preferably has a generally flat surface 25 and a downwardly turned edge 26 (see FIG. 2), the panel having a width sufficiently great that the edge 26 overhangs opening rim 23. Resilient gasket strips as at 27 may be affixed to the underside of the panel for sealing purposes.

Each roof panel is held down by a series of snap action or over-center clamp mechanisms indicated generally at 30 in the drawings, which are mounted to the roof framework 10 around the periphery of the vent opening. The clamps bear on the top surfaces 25 of the roof panels 20, pressing the gasket strips 27 against the rims 23. The edge 26 acts as a flange to help the respective roof panel carry the pressure load from clamp to clamp. The hold-down force is resiliently applied and, when gas pressure in the vent opening below the roof panel exceeds the total hold-down force, the roof panel will be lifted against the biasing force applied to it by the clamps. The roof panel may be lifted a certain amount without causing the clamps to release (see FIG. 5); that is, the clamps will accommodate some venting without snapping open and disengaging from the roof panel. When, however, the roof panel is raised more than that limited amount, which suitably may be about $1\frac{1}{8}$ to $1\frac{3}{8}$ inches, the clamps will snap open and altogether release the hold-down force on the panel so that the panel is freed and can be blown off to permit free pressure venting.

In the embodiment shown, these clamps are spaced approximately every 0.83 to 1.75 feet around the periphery of each roof opening, but this spacing depends on internal operating pressure and explosion pressure, and can be changed to suit conditions.

The details of the clamps 30 are shown in FIGS. 4–7. Each clamp is mounted to and supported by a standard or upstanding bracket 31 which is secured as by welding at its lower end to the roof framework 10. A latch member 34 is movably mounted for swinging movement about a horizontal axis 35, parallel to the adjacent roof panel edge 26 (see FIG. 4). Latch member 34 is roughly L-shaped, having a projecting arm portion 36 which presents a latch surface or bearing surface 37 that in use is engaged with and bears downwardly on the upper surface 25 of roof panel 20. Latch member 34 is pivoted for rotation about axis 35 on a shaft 39 which at one end is secured to bracket 31 and at the opposite end is supported on a leg 40 secured to the roof framework. A bearing or bushing 41 may be provided to take the relative rotation between latch member 34 and axle 39 (see FIG. 7).

Latch member 34 is swingable about axis 35 between two positions: a closed position shown in FIG. 4, in which latch surface 37 is engaged with and bears on roof panel surface 25, and an open position shown in FIG. 6 in which the latching member is disengaged from and clear of the roof panel to permit the latter to be blown off the vent opening. In the open position the latch member 34 bears against a fixed stop 43 which is mounted to the roof framework.

Movement of latch member 34 from both the open and the closed positions is resisted by a yieldable, elastic, over-center mechanism designated generally by 45. This mechanism includes a shaft 46 which is threaded at a first or lower end into a clevis 47 which in turn is pivotally connected to latch member 34 by an axle 48 (see FIG. 7) that is parallel to axle 39. At its upper or second end, shaft 46 passes through a fixed eye 51 which is mounted to bracket 31. Eye 51 has an internal aperture 52 of diameter greater than that of shaft 46, to accommodate the swinging or pivotal movement of the shaft which accompanies latch member movement between the extreme positions of FIGS. 4 and 6. A coil spring 54 is captured on shaft 46 and bears at its upper end against eye 51 through a washer. At its lower end spring 54 bears against a nut 55 on a shaft, through a washer 56. Thus spring 54 biases clevis 47 downwardly, relative to eye 51, acting on the clevis through nut 55 and shaft 46.

It can be seen in FIG. 4 that when latch member 34 is in the closed position, the line of action of spring 54 is directed to the right of an imaginary center line 57 (called the instantaneous axis), which runs between axis 35 and eye 51, so that the spring tends to urge latch member 36 clockwise about axis 35, to urge the roof panel closed. When the latch member is moved across the instantaneous axis 57 toward open position, the line of action reverses, and the spring moves the latch member counterclockwise, against stop 43. Thus, the spring imparts a toggle or snap action to the latch member, such that the latch has two stable positions, one on each side of center; it resists being moved from one side to the other, and once it has crossed center, it tends to remain on that side. The latch member is so configured that when internal pressure lifts the roof panel as shown in FIG. 5, the outer end of arm 36 is cammed to slide toward and (if the lift is sufficient) off the edge of the panel. It is an advantage that until the clamp has released, the cover can reclose the vent if the pressure has been released. Thus in this respect the clamp mechanism has a double function: (1) it permits the cover to lift up to a certain maximum distance to vent pressure, and then to reclose if pressure drops; and (2) when the pressure rise is so rapid, as in an explosion, as to lift the clamp a greater distance, then the cover is released altogether to provide wide area venting for much more rapid release of pressure. The release occurs approximately when shaft 46 crosses instantaneous axis 57, the panel is then freed of the clamp so that it can be blown away by the escaping gas. For improved release it is desirable to provide a chamfer or camming surface as at 60, on the edge of the roof adjacent the area engaged by latch surface 37, to insure smooth release at the edge.

A clamp cap or cover 61 is provided which may be slipped over bracket 31 or otherwise mounted to cover and protect the clamp from weather. This housing has a front opening at 62 which provides clearance for the toggle and latch member, in closed position.

To facilitate field installation spring 54 may be precompressed before mounting, that is, compressed beyond the use amount, and the precompression then removed after the latch member has been seated on the roof panel. For this purpose a precompression nut 64 (shown in phantom lines in FIG. 4) is threaded onto the upper end of shaft 46, above eye 51, to compress the spring between nuts 64 and 55. Pivot axle 48 can then easily be inserted to connect clevis 47 to latch member 36. With a roof panel 20 in place over opening 21 and the latch in the closed position, nut 64 is then backed off, so that the length and hence the compression of spring 54 is determined by the position of nut 55 in relation to eye 51.

In order to provide a greater hold-down force on a roof panel, nut 55 is tightened on shaft 46, i.e., it is moved relatively upward. Such adjustment may be useful to achieve a balance between the hold-down forces of the several clamps acting on a given roof panel, so that all will release at approximately the same instant and thereby prevent unbalanced unlatching of one side of a panel before the other side is unlatched. In this same connection, the spacings of the latches are calculated so that each latch will carry the same load. By reason of the panel configuration, latch spacings may differ around the perimeter of the panel.

It can be seen that the over-center mechanism will accommodate upward movement of the roof panel without unlatching, up to the point that shaft 46 moves over center or until the latching member slides off the edge of the roof panel, whichever first occurs. As the roof panel moves off the vent opening, it increasingly compresses the spring, but as this occurs the effective length of the pivot arm is decreasing at a faster rate than the spring force is increasing. For this reason the hold down force on the panel decreases as the cover is lifted. If the bin internal pressure drops sufficiently by venting through the opening thus provided, the vent will close. However, in the case of an explosion the pressure continues to increase even after the roof panel has been partially lifted, because the venting is not yet sufficient. Once the latch has been moved across center it will remain in the open position shown in FIG. 6, to permit full venting and pressure release. In this connection, it is important to use small, light panels, so that they can be rapidly accelerated by the rapid pressure rise. Their low inertia enables them to be moved out of the way quickly, whereas a panel that is too heavy will not be moved out of the way fast enough and the resulting pressure rise could lead to catastrophic failure of the bin.

By way of particular example, we have used 14 clamps, each having a spring of 4 inch free length and 1470 lbs/inch spring constant, to hold roof panels of 2700 sq. in. area, against an internal pressure of up to about 2 pounds per square inch.

The roof panels may be unattached to the roof so that, once released, they can be completely blown off by internal pressure. However, the force of even a low level explosion may tend to scatter the roof panels dangerously. For this purpose it is desirable to loosely retain the roof panels on the bin, as by hinges and/or chains. A preferred mechanism for doing so, as shown in the drawings, includes the provision of loose or lost motion hinge means as shown in FIGS. 1 and 3. Hinges 70 are mounted around the peripheral flange 12 on the roof framework and comprise a pair of parallel spaced upstanding ears 71, each having an elongated vertical slot 72. A tab 73 projects from the adjacent downturned edge 26 of the roof panel, between the two ears 71, and has a stub pin 74 engaged in the ear slots 72. This permits a certain amount of lost motion movement between the roof panel and the hinge such that the roof panel can be lifted in a vertical direction a short distance, suitably 2 to 3 inches, before pivoting movement about pin 74 starts to occur. During this lifting an annular gap is presented between the roof panel 20 and the vent opening rim 23 through which gas pressure is released without necessarily tripping the clamps. As the toggle mechanism is tripped, pin 74 comes into engagement against the upper end of slot 72 and the roof panel begins to swing outwardly about the hinges. The opposite edges of the roof panel may be restrained by chains 77 of sufficient length to permit full venting. The chains run between the eyes welded to the roof panel, and the framework 10.

After full venting, when the roof panels have been replaced, the clamps can be reset simply by forcing shaft 46 back across center, using a long lever for that purpose.

FIG. 8 of the drawing shows a double clamp arrangement 79 wherein two clamps, each similar to that already described, are mounted side-by-side but facing in opposite directions, on a frame member 22, for engaging adjacent roof panels (see FIG. 1). This arrangement is convenient although not necessary.

Having described the invention, what is claimed is:

1. In an explosion vent for rapidly releasing pressure buildup within a vessel, wherein the vent is of the type including,
    a framework mountable to said vessel and defining a series of vent openings,
    a series of vent covers releasably seatable on the respective vent openings to close the same,
    each vent cover being associated with a series of quick-release clamp mechanisms engaging it around its periphery for releasably holding the cover in place on the respective vent opening,
    the improvement in the clamp mechanism comprising,
    a latch member connected at one end thereof to said framework by a pivot, said latch member presenting at an opposite end thereof a bearing surface engageable on an edge portion of the respective cover to apply a vent closing force thereon,
    said latch member being swingable about said pivot between a closed position, in which said bearing surface bears upon said cover to press the same toward said framework, and an open position in which said latch member is clear of said cover,
    a shaft swingably connected at a first point to said latch member between said pivot and said bearing surface, said shaft movably attached at a second point to a support on said framework, the shaft being so mounted that when said latch member is in said closed position said shaft lies on one side of an imaginary line between said pivot and said second point, and on an opposite side of said imaginary line when said latch member is in said open position,
    a spring in compression on said shaft and biasing said latch member away from said second point,
    the cover being connected to said framework for lineal movement away from the opening,
    said spring exerting a biasing force that changes as said cover is lifted from said vent opening by gas pressure in the vessel, said spring yielding in response to gas pressure below said cover, up to a predetermined pressure, without releasing any of the clamp mechanisms, whereby said cover lifts lineally from said vent opening, such lineal movement establishing an annular gap between said cover and vent opening through which gas pressure can vent uniformly around said periphery, said clamp mechanisms remaining engaged with said cover for reseating the cover if said pressure drops,
    said spring yielding further to a pressure rise above said predetermined pressure and said latching member moving clear of said cover, to release the same.

2. The explosion vent of claim 1 wherein said vent covers are connected to said framework for movement in a linear direction away from the springs, up to a predetermined distance, and for pivoting movement thereafter.

3. In an explosion vent for rapidly releasing pressure buildup within a vessel, wherein the vent is of the type including,
    a framework mountable to said vessel and defining a series of vent openings,
    a series of vent covers releasably seatable on the respective vent openings to close the same,
    each vent cover being associated with a series of quick-release clamp mechanisms engaging it around its periphery for releasably holding the cover in place on the respective vent opening,
    the improvement in the clamp mechanism comprising,
    a latch member connected at one end thereof to said framework by a pivot, said latch member presenting at an opposite end thereof a bearing surface engageable on an edge portion of the respective cover to apply a vent closing force thereon,
    said latch member being swingable about said pivot between a closed position, in which said bearing surface bears upon said cover to press the same toward said framework, and an open position in which said latch member is clear of said cover,
    a shaft swingably connected at a first point to said latch member between said pivot and said bearing surface, said shaft movably attached at a second point to a support on said framework, the shaft being so mounted that when said latch member is in said closed position said shaft lies on one side of an imaginary line between said pivot and said second point, and on an opposite side of said imaginary line when said latch member is in said open position,
    a spring in compression on said shaft and biasing said latch member away from said second point, and
    lost motion hinge means connecting the cover at one side thereof to the framework for lineal movement from the opening up to a predetermined distance, and for pivoting movement thereafter,
    said spring exerting a biasing force that changes as said cover is lifted from said vent opening by gas pressure in the vessel, said spring yielding in response to gas pressure below said cover, up to a predetermined pressure, without releasing any of the clamp mechanisms, whereby said cover lifts lineally from said vent opening, such lineal movement establishing an annular gap between said cover and vent opening through which gas pressure can vent uniformly around said periphery, said clamp mechanism remaining engaged with said cover for reseating the cover if said pressure drops,
    said spring yielding further to a pressure rise above said predetermined pressure and said latching member swinging clear of said cover, to release the same.

4. The improvement of claim 3 further wherein said spring is compressed increasingly as the latch is swung about the pivot toward said imaginary line, but at a lesser rate than the effective lever arm is decreased between said first point and said pivot, the hold down force on the cover thereby decreasing.

5. The explosion vent of claim 3 further wherein said edge portion of said cover is a camming surface,
    movement of said cover off said opening swinging said latch member about said pivot in a direction that brings said bearing surface toward said camming surface, said camming surface functioning to disengage said latch member more smoothly from said cover.

6. The explosion vent of claim 5 wherein said camming edge is a chamfered edge.

7. The explosion vent of claim 3 further including precompression means comprising, an adjustably positionable stop nut on said shaft outward of said second point, said stop nut preventing said spring from moving said first point more than a fixed distance away from said second point.

8. The explosion vent of claim 3 wherein said vessel is a storage bin and said framework is a roof framework mountable to said bin.

9. The explosion vent of claim 3 wherein the lost motion hinge means comprises a pin movable in slotted members on said framework.

10. The explosion vent of claim 1 wherein said shaft is swingably attached at the second point to a support bracket connected to the framework, by projecting through an eye presented by said bracket.

11. The explosion vent of claim 3 wherein said latch member has an outwardly extending arm which presents said bearing surface.

12. The explosion vent of claim 11 wherein said shaft is connected at said first point to said arm.

* * * * *